United States Patent
Fan et al.

(10) Patent No.: US 9,187,646 B1
(45) Date of Patent: *Nov. 17, 2015

(54) TUNING AND SYNTHESIS OF SEMICONDUCTOR NANOSTRUCTURES BY MECHANICAL COMPRESSION

(71) Applicant: Sandia Corporation, Albuquerque, NM (US)

(72) Inventors: Hongyou Fan, Albuquerque, NM (US); Binsong Li, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/905,959

(22) Filed: May 30, 2013

Related U.S. Application Data

(63) Continuation-in-part of application No. 12/880,886, filed on Sep. 13, 2010, now Pat. No. 8,455,048.

(60) Provisional application No. 61/315,270, filed on Mar. 18, 2010, provisional application No. 61/804,071, filed on Mar. 21, 2013.

(51) Int. Cl.
| | |
|---|---|
| B05D 3/12 | (2006.01) |
| C09C 1/04 | (2006.01) |
| C09C 1/00 | (2006.01) |
| C09C 1/10 | (2006.01) |
| B82Y 40/00 | (2011.01) |
| C09C 1/14 | (2006.01) |
| B82Y 30/00 | (2011.01) |

(52) U.S. Cl.
CPC ... *C09C 1/04* (2013.01); *C09C 1/00* (2013.01); *C09C 1/10* (2013.01); *B05D 3/12* (2013.01); *B82Y 30/00* (2013.01); *B82Y 40/00* (2013.01); *C09C 1/14* (2013.01); *Y10S 977/888* (2013.01)

(58) Field of Classification Search
CPC ......... B05D 3/12; B82Y 30/00; B82Y 40/00; B22F 1/0018; B22F 1/0022; B22F 2302/00; B22F 2202/00; C09C 1/00; C09C 1/04; C09C 10/10; C09C 1/14; Y10S 977/888
USPC .................................. 427/355, 359, 365, 369
See application file for complete search history.

(56) References Cited

U.S. PATENT DOCUMENTS

| | | | |
|---|---|---|---|
| 6,395,214 B1 * | 5/2002 | Kear et al. | 264/434 |
| 8,092,595 B1 | 1/2012 | Fan et al. | |
| 2008/0096293 A1 | 4/2008 | Suhir et al. | |

OTHER PUBLICATIONS

Tolbert et al. "High-Pressure Structural Transformations in Semiconductor Nanocrystals", Annu. Rev. Phys. Chem. 46, 1995, pp. 595-625.*

H. Wu, et al., Nanostructured Gold Architectures Formed through High Pressure-Driven Sintering of Spherical Nanoparticle Arrays, J Am Chem Soc. 2010. DOI: 10.1021/ja105255d.

(Continued)

*Primary Examiner* — Kirsten Jolley
(74) *Attorney, Agent, or Firm* — Kevin W. Bieg

(57) ABSTRACT

A mechanical compression method can be used to tune semiconductor nanoparticle lattice structure and synthesize new semiconductor nanostructures including nanorods, nanowires, nanosheets, and other three-dimensional interconnected structures. II-VI or IV-VI compound semiconductor nanoparticle assemblies can be used as starting materials, including CdSe, CdTe, ZnSe, ZnS, PbSe, and PbS.

10 Claims, 9 Drawing Sheets

(56) References Cited

OTHER PUBLICATIONS

H. Wu, et al., Pressure-Driven Assembly of Spherical Nanoparticles and Formation of 1D Nanostructure Arrays, Angew. Chem., 122, Int. Ed. 2010. DOI:10.1002/ange.2010011581.

Wu, et al., Pressure-Driven Assembly of Spherical Nanoparticles and Formation 1D Nanostructure Arrays, ACS Meeting Aug. 2010, Boston, MA.

Dong et al., "Pressure-induced morphology-dependent phase transformations of nanostructured tin dioxide," Chemical Physics Letters, 480, Aug. 2009, pp. 90-95.

* cited by examiner

TUNING AND SYNTHESIS OF SEMICONDUCTOR NANOSTRUCTURES BY MECHANICAL COMPRESSION

CROSS-REFERENCE TO RELATED APPLICATIONS

This application is a continuation-in-part of U.S. application Ser. No. 12/880,886, filed Sep. 13, 2010, which application claimed the benefit of U.S. Provisional Application No. 61/315,270, filed Mar. 18, 2010, both of which are incorporated herein by reference. This application claims the benefit of U.S. Provisional Application No. 61/804,071, filed Mar. 21, 2013, which is incorporated herein by reference.

STATEMENT OF GOVERNMENT INTEREST

This invention was made with Government support under contract no. DE-AC04-94AL85000 awarded by the U.S. Department of Energy to Sandia Corporation. The Government has certain rights in the invention.

FIELD OF THE INVENTION

The present invention relates to semiconductor nanostructures and, in particular, to a method for the tuning and synthesis of semiconductor nanostructures by mechanical compression.

BACKGROUND OF THE INVENTION

Nanoparticles (e.g., sizes below about 100 nm) of II-VI semiconductor compounds have been known to exhibit quantum confinement. Quantum confinement results when the electrons in a material are confined to a very small volume. Quantum confinement is size and shape dependent, meaning the properties of the nanoparticles are tunable based on their size and shape. Such nanoparticles may have applications in opto-electronic devices, laser diodes, nanosensing, and biomedical imaging. However, there remains a need for a method to synthesize semiconductor compounds in other nanostructure architectures that may exhibit quantum confinement.

SUMMARY OF THE INVENTION

The present invention is directed to a method for tuning nanoparticle lattice structure and the synthesis of semiconductor nanostructures by mechanical compression, comprising providing a semiconductor nanoparticle assembly and mechanical compressing the nanoparticle assembly. The semiconductor nanoparticles can comprise II-VI or IV-VI semiconductors, including CdSe, CdTe, ZnSe, ZnS, PbS, and PbSe. The nanoparticle lattice structures can be tuned to reversibly shrink and swell when the applied pressure or stress is less than a threshold pressure using a diamond anvil cell or other means of mechanical compression. For example, for CdSe nanoparticles assemblies the threshold pressure is about 8 GPa. Reversible tuning of the interparticle distance below the threshold pressure enables the investigation of interparticle-spacing-dependent physical properties, such as surface plasmonic resonances, that result from the coupling of nanoparticles under compression. Such control of the interparticle distance by mechanical compression can be useful for charge or energy transfer based device applications in sensing, photovoltaic, and surface plasmonic imaging. When the applied stress is over the threshold pressure, the nanoparticle assemblies begin to contact, coalesce, and sinter together to irreversibly form a completely new semiconductor nanostructure. For example, the new semiconductor nanostructure can comprise a dimer, trimer, nanorod, nanowire, nanosheet, or other three-dimensional architecture. Such new nanostructures may exhibit quantum confinement.

BRIEF DESCRIPTION OF THE DRAWINGS

The detailed description will refer to the following drawings, wherein like elements are referred to by like numbers.

DETAILED DESCRIPTION OF THE INVENTION

The present invention is directed to a mechanical compression method for tuning nanoparticle lattice structure and the synthesis of new semiconductor nanostructures including nanorods, nanowires, nanosheets, and three-dimensional (3D) interconnected structures. II-VI or IV-VI compound semiconductor nanoparticle assemblies can be used as starting materials, including CdSe, CdTe, ZnSe, ZnS, PbSe, and PbS, as well as other semiconductors, including Ge. For example, ordered spherical CdSe nanoparticle assemblies can be used as starting materials. According to the invention, pressure can be applied to periodically ordered assemblies of such nanoparticles. Gradual elevation of external pressure from ambient condition up to a threshold pressure induces shrinkage of the lattice of the ordered assemblies and causes shrinkage of interparticle spacing within the ordered assemblies. Further increasing of pressure over threshold drives the nanoparticles to contact, coalesce, and finally weld/sinter to form new nanostructures. Dispersion of the sintered nanostructures in organic solvents results in uniform single nanostructures that can reassemble into ordered arrays upon evaporation of the solvent. Depending on the size of the nanoparticles and orientation of the initial ordered assemblies, new nanostructures such as nanorods, nanowires, and nanosheets can be synthesized. For example, nanowires that are uniform in diameter can have very close to the diameter of the initial nanoparticles and length of a few hundreds nanometers to a few micrometers. Additionally, nanosheets or 3D interconnected structures can also be synthesized in this process by using different sizes of nanoparticles.

Figure 1:
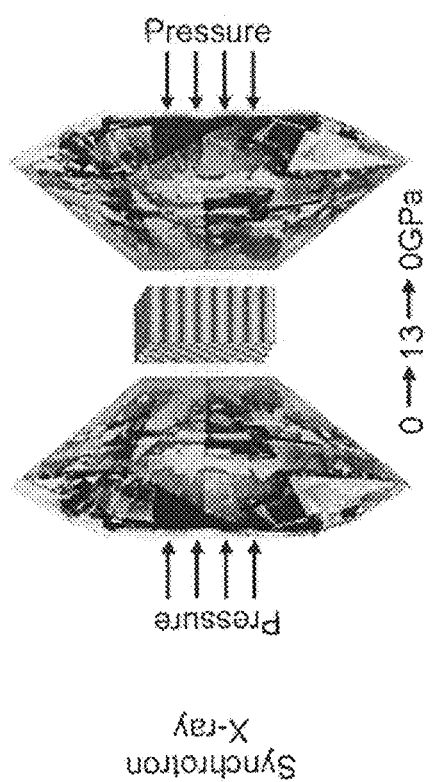
FIG. 1 is a schematic illustration of a diamond anvil cell (DAC) that can be used for mechanical compression of nanoparticles.

A diamond anvil cell (DAC) can be used to mechanically compress the semiconductor nanoparticle assemblies. A DAC consists of two opposing diamonds with a sample compressed between the culets. Pressure may be monitored using a reference material, such as ruby fluorescence, whose behavior under pressure is known. The uniaxial pressure supplied by the DAC may be transformed into uniform hydrostatic pressure using a pressure transmitting medium. The pressure-transmitting medium is enclosed by a gasket and the two diamond anvils. FIG. 1 is a schematic illustration of a DAC that can be used for mechanical compression of a nanoparticle assembly. The nanoparticle assembly can be embedded in a polymer (e.g., polystyrene) film as the pressure transmitting medium. Transparency of the DAC allows in-situ optical characterizations of interparticle-spacing-based physics and monitoring of the structural evolution of the nanoparticle assembly using synchrotron x-ray scattering. In particular, in-situ small—(SAXS) and wide-angle (WAXS) synchrotron X-ray scattering measurements on the same spot of a sample under pressure coupled with transmission electron microscopy (TEM) enable reconstruction of the ordering of nanoparticles to form nanorods and nanosheets upon mechanical compression. Other moderate- and high-pressure compression devices can also be used, such as piston-cylinder devices, multi-anvil cells, or embossing machines. Further, mechanical compression can be applied to nanoparticles between two flat surfaces, between two patterned surfaces, between flat and patterned surfaces, and in liquid or solid media. The external pressure can be used to overcome specific interparticle interactions, enabling engineering of the nanoparticle assembly by allowing fine-tuning of lattice structure and interparticle separation distance and to fabricate new nanoparticle architectures. In particular, pressure-directed nanoparticle assembly enables production of chemically and mechanically stable nanostructures which are not possible using current top-down and bottom-up methods.

As an example of the invention, CdSe nanoparticles with various sizes were synthesized according to a modified literature method. See Z. Adam Peng and Xiaogang Peng, *J. Am. Chem. Soc.* 123, 183 (2001). Cadmium oxide (CdO) was dissolved in octadecylphosphonic acid (ODPA) and trioctylphosphine oxide (TOPO) to generate a homogeneous solution at high temperature. Introduction of selenium stock solution yielded high quality nanocrystals. The resulting CdSe nanoparticles with diameters of 3 nm and 5.5 nm were used in the experiments described below. 80 mg of CdSe nanoparticles and 20 mg polystyrene were dissolved in 1 mL toluene. An appropriate amount of this solution was drop-cast onto a silicon wafer to form a film comprising a periodically ordered assembly of CdSe nanoparticles. A piece of the CdSe nanoparticle film (about 100 μm in diameter) was loaded into a DAC for nanostructure synthesis and in situ pressure measurement.

Two gem-quality diamond anvils with a culet size of 500 μm were aligned to generate pressure. A stainless-steel gasket was pre-indented, and the thickness reduced from 250 μm down to 70 μm. A 250-μm-diameter hole was drilled and served as the sample chamber. Silicone oil was used as the pressure transmitting fluid. The pressure in the diamond cell was determined using a standard pressure-dependent ruby fluorescent method. In situ high-pressure small-angle and wide-angle X-ray scattering (HP-SAXS and HP-WAXS) measurements were performed at room temperature at an angle dispersive synchrotron beamline at Cornell High Energy Synchrotron Source (CHESS). White synchrotron x-ray beam was optimized at the monochromatic wavelength of 0.7749 Å using two Ge single crystals cut at (111). A collimator was used to reduce the beam down to 100 μm, and a Mar345 image plate detector was use to collect SAXS and WAXS patterns. The distance between sample and detector was calibrated by Ag-behenate and $CeO_2$ standard for SAXS and WAXS, respectively. The collected X-ray diffraction patterns were integrated by the Fit2D software (Andrew P. Hammersley. European Synchrotron Radiation Facility (ESRF)). Upon pressure release, the sample was carefully removed from the gasket and cleaned using a small amount of solvents (e.g., toluene and ethanol). High-resolution transmission electron microscopy (HRTEM), a UV/Vis/NIR spectrophotometer, and a fluorometer were used to characterize and analyze the samples before and after application of pressure.

Figure 2:
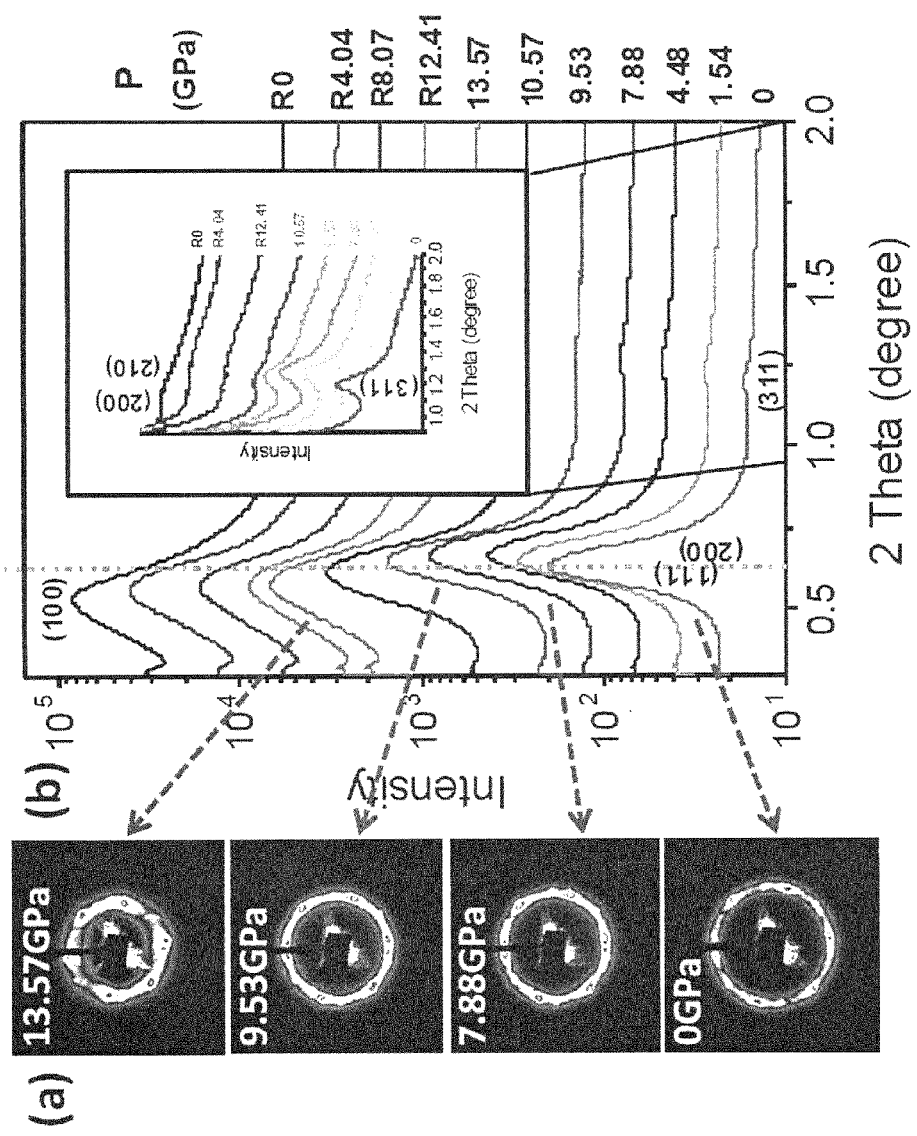
FIG. 2(a) shows HP-SAXS patterns of CdSe-nanoparticle assemblies at ambient pressure, 7.88 GPa, 9.53 GPa, and 13.57 GPa.
FIG. 2(b) shows integrated spectra derived from the HP-SAXS patterns at various pressures during compression and release.

FIG. 2 shows the structural evolution of CdSe nanoparticle assemblies during compression and release. FIG. 2(a) shows HP-SAXS patterns of CdSe-nanoparticle assemblies at ambient pressure, 7.88 GPa, 9.53 GPa, and 13.57 GPa, respectively. FIG. 2(b) shows integrated spectra derived from the HP-SAXS patterns at various pressures P, in GPa, as a function or scattering angle, in 2θ, during compression and release. R before the pressure value indicates a pressure release direction. At ambient pressure, the CdSe nanoparticle assembly exhibits a face-centered-cubic (fcc) mesophase. In the range from ambient pressure to a threshold pressure of about 8 GPa, HP-SAXS data indicate that the CdSe nanoparticle assembly remains in the fcc structure. As the pressure increases to 8 GPa, the HP-SAXS peaks shift slightly to higher 2 theta values (lower d spacing), indicating pressure-induced shrinkage in the unit-cell dimensions. When the sub-threshold pressure is gradually released, all peaks return to their starting positions, indicating the change in unit-cell dimensions is reversible up to a threshold of about 8 GPa. However, when the pressure is increased above about 8 GPa, inter-nanoparticle distances start to increase, indicating expansion of the inter-particle spacing in a direction perpendicular to the compression axis in response to compression in the inter-particle spacing in the parallel direction. Upon release of the above-threshold pressure to ambient, the expanded inter-particle spacing is preserved.

Figure 3:
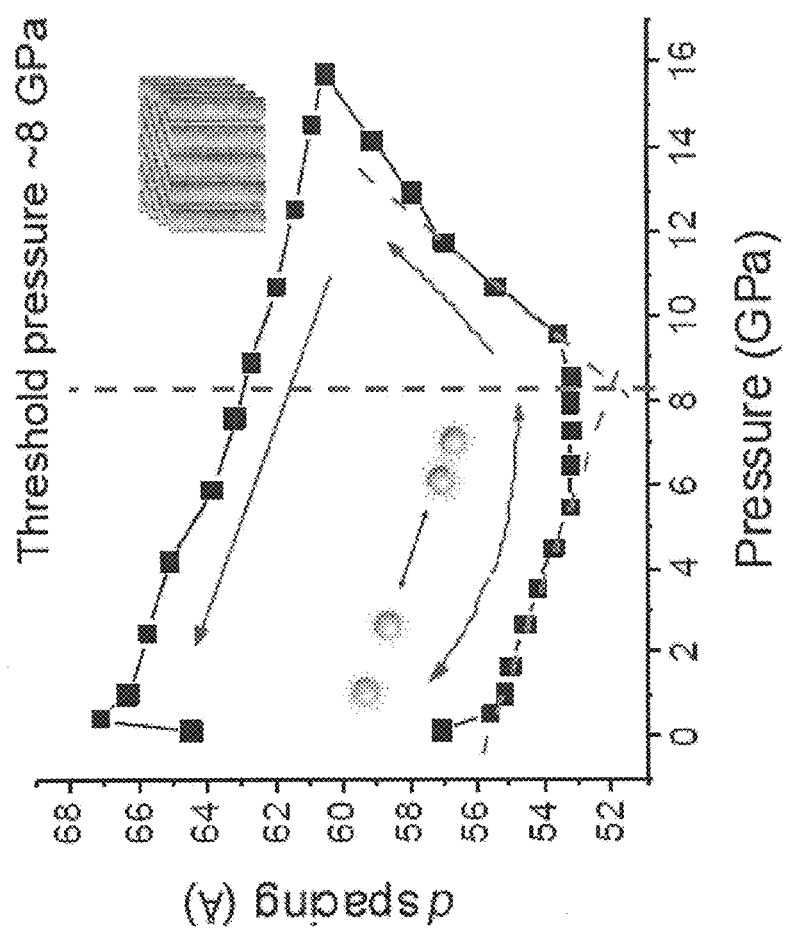
FIG. 3 is a graph of the d-spacing of the first Bragg reflection in each HP-SAXS spectrum shown in FIG. 2(b).

FIG. 3 is a graph of the d-spacing of the first Bragg reflection in each HP-SAXS spectrum shown in FIG. 2(b). The graph indicates that the interparticle spacing in CdSe assemblies below threshold is tunable during compression and release. Below a threshold pressure of about 8 GPa, changes in d spacing are reversible, as denoted by the bidirectional arrow. The nanoparticle assembly exhibits an intermediate structure between about 8 and 16 GPa. The unit-cell dimension changes are irreversible in this pressure range, as denoted by the unidirectional arrows.

Figure 4:
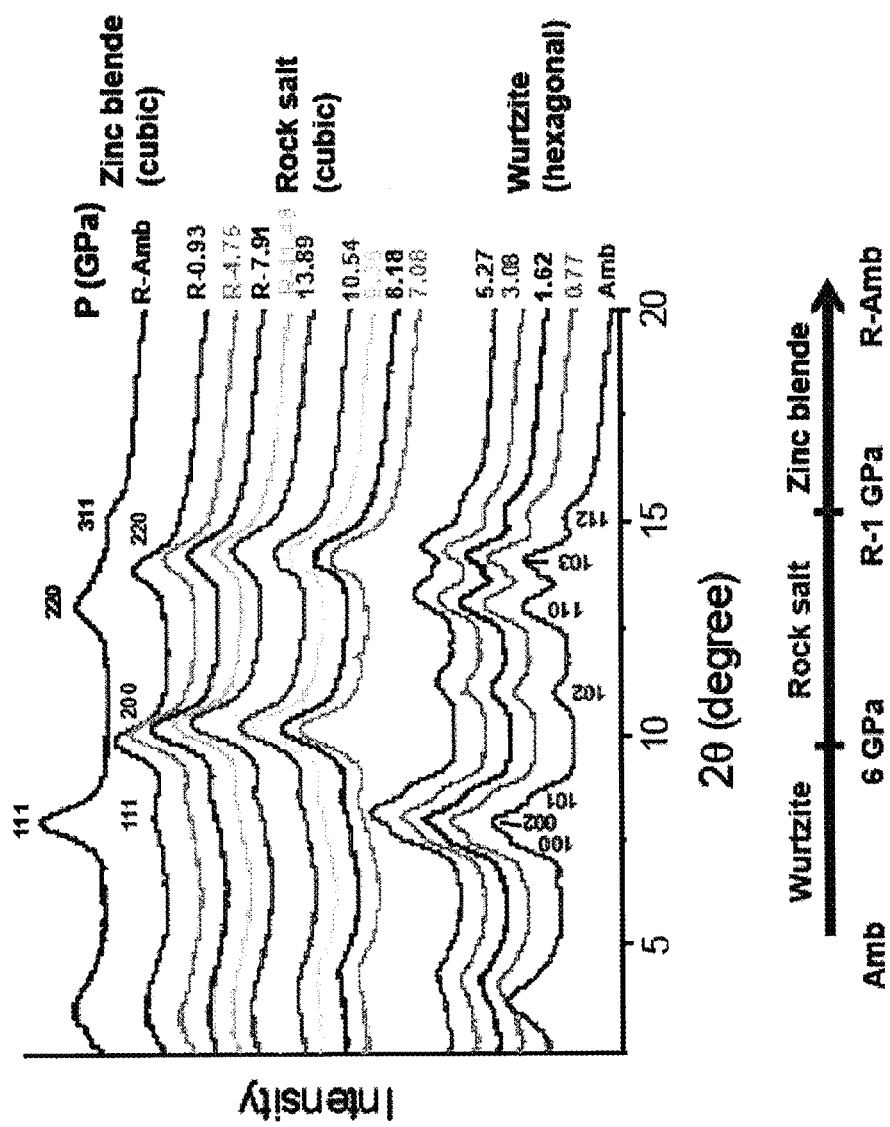
FIG. 4 is a graph showing the atomic lattice phase transition of CdSe nanoparticles during compression and release.

FIG. 4 is a graph showing the atomic lattice phase transition of CdSe nanoparticles during compression and release. See A. P. Alivisatos et al., *Annu. Rev. Phys. Chem.* 46, 595 (1995), which is incorporated herein by reference. R-before the pressure value indicates a pressure release direction. The crystalline form of CdSe converts from wurtzite (hexagonal) at low-pressure to a rock-salt (cubic) structure at moderate pressure and reverts to a zinc blende (cubic) structure upon release from high pressure.

Figure 5B:
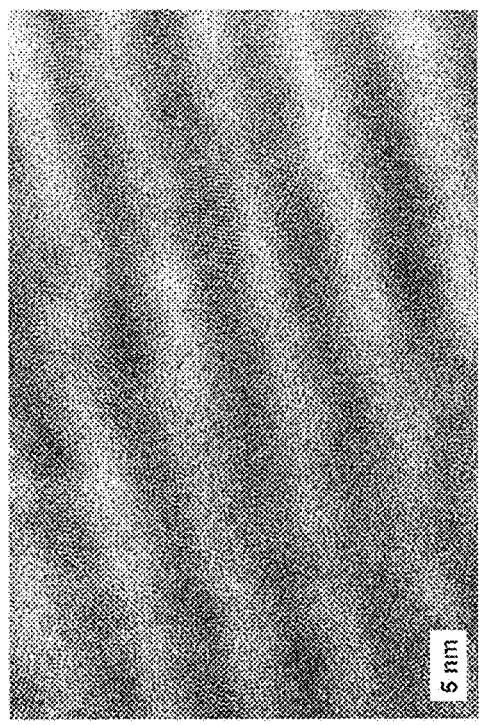
FIG. 5(b) is a HRTEM image of the sintered CdSe nanowires.
Figure 5A:
FIG. 5(a) is a TEM image of CdSe nanowires formed through sintering of 5.5 nm nanoparticles.

The new nanostructures formed above the threshold pressure can be re-dispersed in an organic solvent and recovered by evaporation of the solvent. FIG. 5 shows is an example of the formation of nanowires as a result of irreversible compression of 5.5 nm CdSe nanoparticles above the threshold pressure. FIG. 5(a) is a TEM image of recovered CdSe nanowires. These nanowires have diameters (e.g., ~6 nm)

very similar to the diameters of the starting nanoparticles (e.g., ~5.5 nm). FIG. 5(b) is a HRTEM image of the CdSe nanowires, showing the sintered interface along each nanowire.

Figure 6:
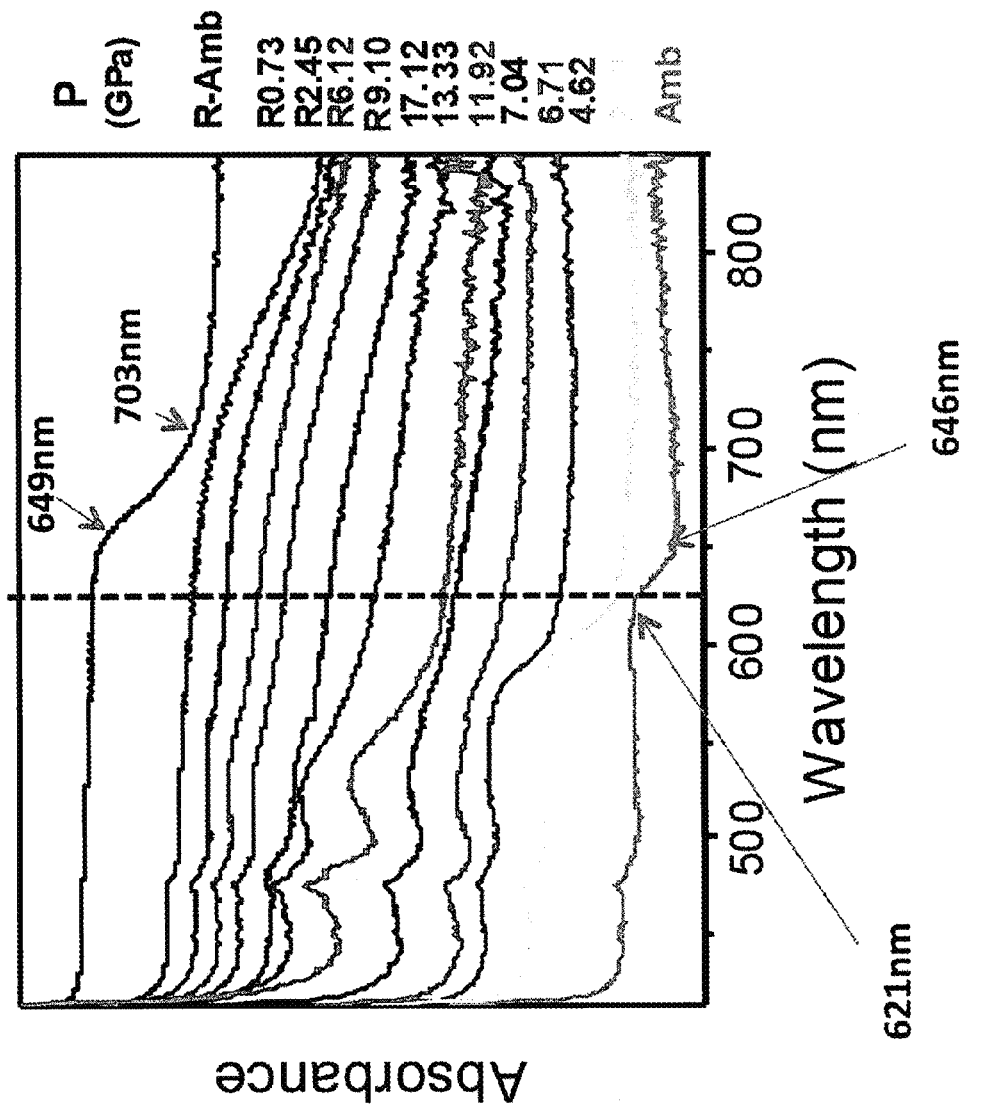
FIG. 6 show in-situ UV-Vis spectra of a 5.5 nm CdSe-polystyrene film in a DAC when increasing the pressure above threshold and releasing the pressure.

FIG. 6 show in-situ UV-Vis spectra of a 5.5 nm CdSe-polystyrene film in a DAC when increasing the pressure to above threshold and releasing the pressure to ambient. Below the threshold pressure, the spectra can be tuned due to the reversible change in interparticle spacing. The blue shift before 6.71 GPa is due to nanoparticle aggregation induced by compression. Above 6.71 GPa, the major absorption peak continues to blue-shift, but the absorption tail extends to long wavelength up to 820 nm, indicating the formation of CdSe nanowires. This example shows that the absorbance spectra irreversibly shift (i.e., from 621 to 649 nm) due to the shrinkage of interparticle spacing (or shrinkage of nanoparticle lattice structure), indicating the sintering of CdSe nanoparticles and the formation of new nanowires when the pressure is increased beyond the threshold pressure.

Figures 7A, 7B:
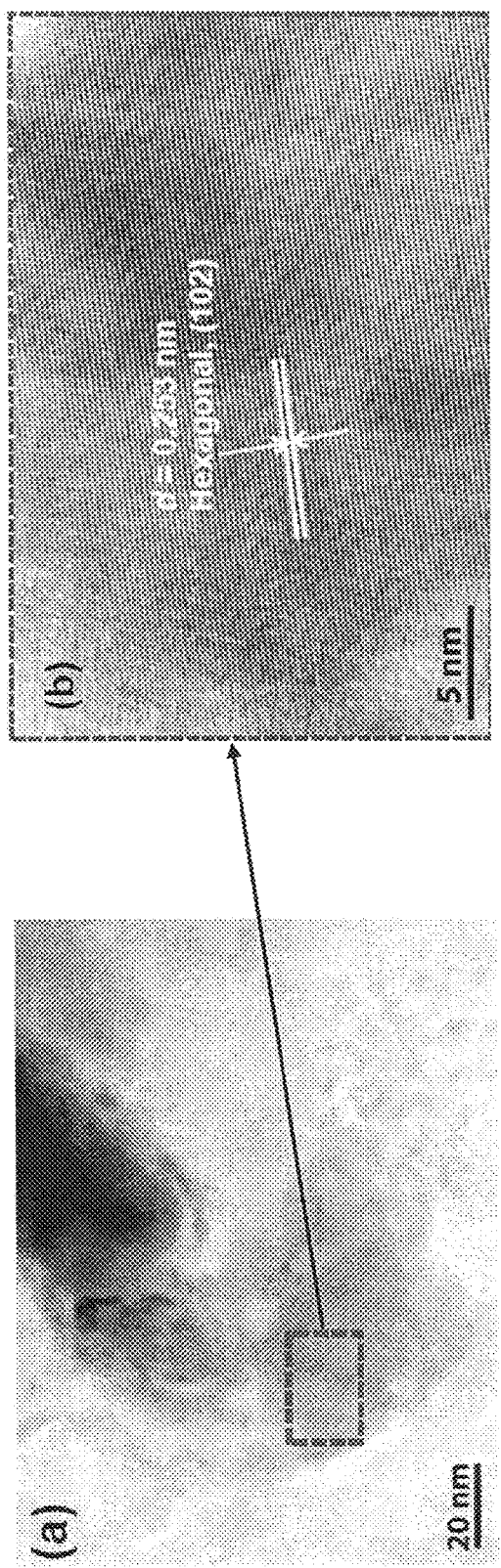
FIG. 7(a) is a TEM image of CdSe nanosheets formed through sintering of 3 nm nanoparticles.
FIG. 7(b) is a HRTEM image of the sintered CdSe nanosheets.

FIG. 7(a) is a TEM image of CdSe nanosheets formed through sintering of 3 nm CdSe nanoparticles. FIG. 7(b) is a HRTEM image of the sintered CdSe nanosheets edge-on, showing the hexagonal (102) planes. The sheet thickness is about 6 nm.

Figure 8:
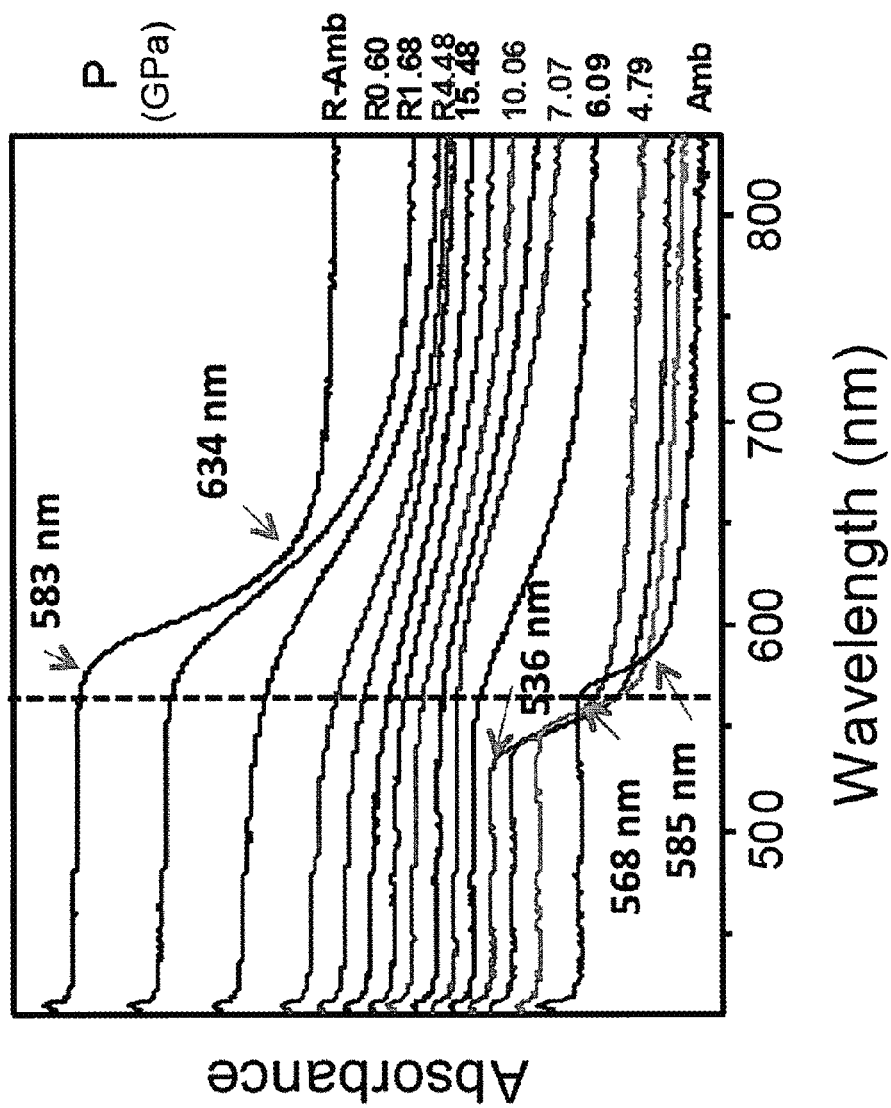
FIG. 8 shows in-situ UV-Vis spectra of a 3 nm CdSe-polystyrene film in a DAC when increasing the pressure above threshold and releasing the pressure.

FIG. 8 shows in-situ UV-Vis spectra of a 3 nm CdSe-polystyrene film in a DAC when increasing the pressure above threshold and releasing the pressure. The characteristic absorption peak of CdSe nanoparticles is blue shifted (from about 568 nm to 536 nm) until the pressure is ~5 GPa, which is due to nanoparticle aggregation induced by compression. Thereafter, the absorption starts to extend to long wavelength. The absorption tail of the final product shows about a 50 nm red-shift (from 585 nm to 634 nm) comparing to the starting CdSe nanoparticles, indicating the sintering of CdSe nanoparticles and the formation of a new nanostructure. The new nanostructure was confirmed to be nanosheets by the TEM characterizations.

Figure 9:
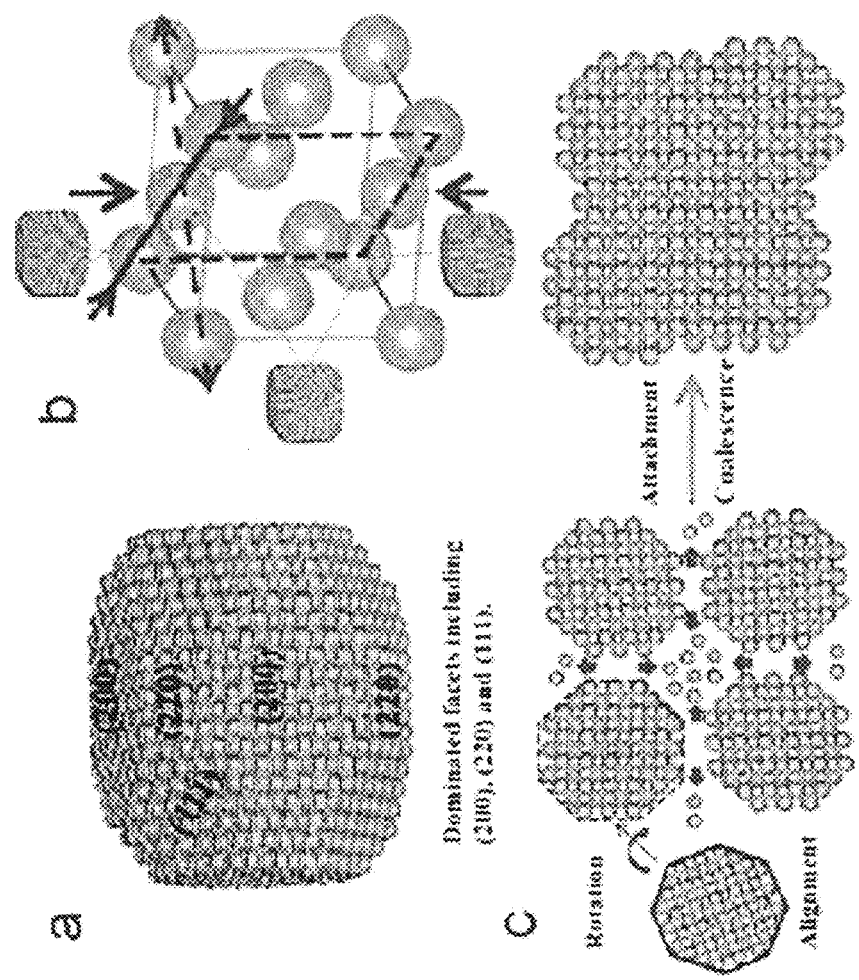
FIG. 9 illustrates a model of high pressure-driven oriented sintering of a single crystal nanosheet.

FIG. 9 illustrates a model of high pressure-driven oriented sintering of a single crystal nanosheet, based on theories of Wulff crystallographic reconstruction and surface energy minimization. See Z. Wang et al., *J. Am. Chem. Soc.* 133, 14484 (2011), which is incorporated herein by reference. FIG. 9(a) shows nanoparticles terminated at the surface by (200), (220), and (111) low surface energy facets. In general, the DAC is capable of maintaining a hydrostatic environment of loaded samples to up to about the threshold pressure. Above this threshold, generation of deviatoric stress results in a pressure gradient vertically across the sample. Initially, compression of the nanoparticles generates a small pressure gradient across the sample. Deviatoric stress acts as a driving force that develops a (110) preferred orientation in the cubic lattice with (110) planes parallel to the compression axis. Simultaneously, nanoparticles in each (110) plane rotate, so that their (200) and (220) planes become parallel to the corresponding planes in the neighboring nanoparticles. As a result, corresponding planes in the neighboring nanoparticles join, leading to the development of a preferential orientation within each nanoparticle array. FIG. 9(b) shows uniaxial compression and resulting compression and tension in a plane normal to the oriented nanoparticle array (110). The pressure gradient increases and deviatoric stress is enhanced, so that the nanoparticles at the (220) and (200) surfaces are squeezed out from the uniaxial compression and travel radially. Upon increasing pressure, enhanced deviatoric stress produces an anisotropic field that includes two compression directions and one tensile direction. In one direction within the plane normal to the compression axis, tensile stress acts to drive the movement of nanoparticles which, in turn, results in a reverse expansion of inter-nanoparticle distance in one (110) direction. Above threshold, oriented nanoparticles within each array completely coalesce together into a group of single-crystal nanosheets that simultaneously stack into a periodically ordered lamellar mesostructure. FIG. 9(c), left, shows stress-tuned rotation and alignment along array (110) seen from downzone rock salt [100]; right, shows a sintered single crystal sheet via oriented attachments.

The present invention has been described as a method for the tuning and synthesis of semiconductor nanostructures by mechanical compression. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A method for the synthesis of semiconductor nanostructures by mechanical compression, comprising:
   providing a film comprising a periodically ordered assembly of compound semiconductor nanoparticles in a pressure-transmitting medium; and
   compressing the film to a pressure above a threshold pressure above which the compound semiconductor nanoparticles of the periodically ordered assembly of compound semiconductor nanoparticles contact, coalesce, and sinter to synthesize a new nanostructure comprising a nanorod, nanowire, or nanosheet.

2. The method of claim 1, wherein the compound semiconductor comprises a II-VI or IV-VI compound semiconductor.

3. The method of claim 2, wherein the IV-VI compound semiconductor comprises PbSe or PbS.

4. The method of claim 2, wherein the II-VI compound semiconductor comprises CdSe, CdS, ZnSe, or ZnS.

5. The method of claim 1, wherein the periodically ordered assembly comprises a face-centered-cubic mesophase.

6. The method of claim 1, wherein the pressure is applied with a diamond anvil cell.

7. The method of claim 1, wherein the pressure is applied with a piston-cylinder device, multi-anvil cell, or embossing machine.

8. The method of claim 1, wherein the threshold pressure is about 8 GPa.

9. The method of claim 1, further comprising releasing the pressure to ambient after synthesis of the new nanostructure.

10. The method of claim 9, further comprising dispersing the new nanostructure in an organic solvent after releasing the pressure to ambient.

* * * * *